US008668000B2

(12) United States Patent
Carrillo

(10) Patent No.: US 8,668,000 B2

(45) Date of Patent: Mar. 11, 2014

(54) EASY BREAK GEODE

(75) Inventor: Marcos Lionel Carrillo, El Paso, TX (US)

(73) Assignee: Gem Center U.S.A., Inc, El Paso, TX (US)

( * ) Notice: Subject to any disclaimer, the term of this patent is extended or adjusted under 35 U.S.C. 154(b) by 135 days.

(21) Appl. No.: 13/170,881

(22) Filed: Jun. 28, 2011

(65) Prior Publication Data

US 2013/0000835 A1 Jan. 3, 2013

(51) Int. Cl.

| | |
|---|---|
| ***B29C 65/00*** | (2006.01) |
| ***B32B 37/00*** | (2006.01) |
| ***B32B 38/04*** | (2006.01) |
| ***B32B 38/10*** | (2006.01) |
| ***B32B 27/00*** | (2006.01) |

(52) U.S. Cl.

USPC ............. 156/536; 156/512; 225/93; 225/103; 425/289; 206/223; 206/229

(58) Field of Classification Search

USPC ......... 156/258, 264, 254, 256, 292, 152, 512, 156/536; 125/30.01, 23.01; 206/223, 229; 425/289; 225/93, 103

See application file for complete search history.

(56) References Cited

U.S. PATENT DOCUMENTS

| | | | | |
|---|---|---|---|---|
| 4,633,848 | A | 1/1987 | Bresciani | 125/21 |
| 6,932,076 | B2 | 8/2005 | Liao et al. | 125/15 |
| 7,100,595 | B2 | 9/2006 | Koike et al. | 125/13.01 |
| 7,213,591 | B2 | 5/2007 | Nomoto et al. | 125/13.01 |
| 7,661,419 | B2 | 2/2010 | Kim et al. | 125/22 |
| 2009/0283089 | A1 | 11/2009 | Sung | 125/15 |
| 2010/0005733 | A1 | 1/2010 | Anderson | 52/98 |
| 2010/0236170 | A1 * | 9/2010 | Dronia | 52/309.1 |
| 2011/0038668 | A1 | 2/2011 | Exline et al. | 404/17 |

* cited by examiner

*Primary Examiner* — Linda L. Gray

(74) *Attorney, Agent, or Firm* — Melissa Silverstein; Luis M. Ortiz; Kermit D. Lopez

(57) ABSTRACT

An improved geode breaking method, system, and apparatus are disclosed. A geode can be broken or cut into at least two pieces, or grooved with a circumferential groove. The geode pieces can be reassembled and connected to each other using a bonding material that supports the joint formed between the reassembled pieces. The bonding layer can denote a joint guideline to assist in aligning a geode breaking tool for re-breaking the geode. A support layer can be added for additional strength, support, and geode crumbling prevention. The reassembled geode can be safely and easily re-broken without crumbling the exterior and interior surface of the geode. The geode's interior crystals or concentric lines can be safely appreciated within a piece or section of a reassembled and re-broken geode.

18 Claims, 4 Drawing Sheets

EASY BREAK GEODE

TECHNICAL FIELD

The disclosed embodiments relate to rocks and stones. The disclosed embodiments further relate to geodes with cores containing crystals. The disclosed embodiments also relate to breaking, re-assembling, and safely re-breaking a geode.

BACKGROUND OF THE INVENTION

A geode is typically a spherical, geological rock formation with an interior core space containing an inner lining of crystals projecting inward or layers of concentric banding. Geodes are essentially rock cavities or "vugs" with internal crystal formations or concentric banding. The plain geode exterior is generally limestone or a related rock that often reveals nothing of the beautiful, intricate display of interior crystals or banding. Other geodes are completely filled with crystal or solid throughout. These types of solid geodes are called nodules. Geodes can be found all over the world and are most commonly located in deserts, volcanic ash beds, or regions containing limestone. Geodes are commonly found in California, Utah, Arizona, and numerous locations in Mexico, Brazil, and Namibia.

Geodes can be cut open to reveal the crystals in the core of the geode. Quartz is the most common mineral forming crystals within geodes. Still geode cores contain agate, chalcedony, or jasper banding or crystals such as calcite, dolomite, celestite, etc. The color of the crystals depends on the type of contaminant that entered the geode when it was forming. Samples of geodes with unusual colors or highly unlikely formations are either synthetically dyed or altered with artificial colorants or pigments.

There are generally two types of geodes: geodes formed from lava and geodes formed from dolomite, a limestone-like sedimentary rock. Cooling molten lava begins the geode formation process. Cooling lava release gases forming bubbles when gas is trapped within the cooling lava. Trapped bubbles turn into cavities known as thunder eggs once the lava hardens. Minerals, such as quartz, are usually introduced into the thunder egg through a flow of mineral-rich water, thus creating the opportunity for crystals to form within the cavities.

Geodes originating from dolomite start formation when lime sediments develop in warm saltwater. When the saltwater interacts with sediments rich in calcite, the calcite metastasizes into the minerals dolomite and anhydrite. The anhydrite then turns into hard spheroid bodies inside the dolomite, but anhydrite dissolves in a low amount of acid in water. Thus, after acidic water is introduced, outer areas of the anhydrite break away and are replaced with small fibers of crystal quartz. Quartz deposited from mineral-rich waters form crystals within the geode's core. The dolomite then converts from sediment into a hard rock. The center of the anhydrite bodies disperses. Over time the rocks disintegrate, leaving the dolomite to dissolve. The hardened quartz then separated from the dolomite, turning into geodes formed on the ground.

Before opening a geode, it is impossible to know exactly what, if anything is inside. The only way to experience a geode's interior beauty is to open it up. This problematic step often results in crumbled geodes, damage to various tools, and dangerous airborne geode pieces. Much of a geode's beauty is lost when a whole geode crumbles. Geodes can be broken open using a diamond-bladed saw, hammer, hammer and chisel, or rock saw. Diamond-bladed saws are very expensive and dangerous for everyday use. Socks are often used to surround a geode when breaking it with a hammer to prevent bits from flying off into unprotected eyes. It is difficult, however, to accurately break the geode into viable pieces when placing it within a sock and hitting it with a hammer. A pipe cutter can be used to press a rolling carbon blade against a rock to cleanly cut it. Success with pipe cutters and geodes, however, is not guaranteed with every cut. Children, for example, have a very difficult time safely breaking geodes open into salvageable pieces.

Accordingly, there exists a need for an improved means to break, reassemble, and safely re-break a geode to appreciate the beautiful interior core of crystals or concentric banding.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is therefore an object of the disclosed embodiments to provide an improved geode breaking method.

It is another object of the disclosed embodiments to provide a safe geode breaking method to prevent the geode from breaking into crumbled pieces.

It is an additional object of the disclosed embodiments to provide a reassembled geode with a hollow core filled with crystal-like structures or concentric banding that is easily re-breakable.

The above and other aspects can be achieved as is now described. A method, system, and apparatus to easily and safely break a geode are disclosed. A geode can be broken or cut into at least two viable pieces, or grooved with a circumferential groove. The geode pieces can be reassembled and connected to each other using a bonding material that supports the joint formed between the reassembled pieces. The bonding layer can denote a joint guideline to assist in aligning a geode breaking tool for re-breaking the geode. A support layer can be added for additional strength, support, and geode crumbling prevention. The reassembled geode can be safely and easily re-broken without crumbling the exterior and interior surface of the geode. The geode's interior crystals or concentric lines can be safely appreciated within a piece or section of a reassembled and re-broken geode.

The method can comprise dividing a geode into at least two geode pieces; associating the at least two geode pieces together; and reassembling the at least two geode pieces using a bonding material. The method can also include re-breaking the reassembled geode to expose a core of the geode, wherein the core comprises crystals or concentric banding; and cutting the geode into said at least two geode pieces using at least one of the following: a diamond cutting saw, a pipe cutter, a chisel and a hammer. The at least two geode pieces can comprise at least one of the following: hemispheres, uneven pieces, symmetrical pieces, asymmetrical pieces, jigsaw pieces, zig-zag pieces, wave pieces, and sections. The method further comprises applying the bonding material to cover a joint formed between the at least geode pieces of said reassembled geode. The method can also comprise applying the bonding material to an exterior surface of the reassembled geode. The bonding material can comprise at least one of the following: plaster, cement, concrete, glue, epoxy, adhesive, resin, a polymer material, a breakable veneer, a crack-resistant coating, a colorant, and a pigment. The method can further comprise applying a support layer on an exterior surface of the geode, wherein said bonding material engages and covers the support layer and wherein the support layer strengthens and supports a joint formed between the reassembled the at least two geode pieces. The support layer can comprise at least one of the following: a mesh layer, a plastic mesh layer, a wire mesh layer, fabric pieces, fabric lattice, wire lattice, plastic lattice, wire, and wire bits. The method can also comprise cutting a circumferential groove into a geode; applying the bonding material to cover the circumferential groove of the geode; and denoting a location of the circumferential groove in the bonding material. The method of further comprises denoting a location of a joint formed between the reassembled the at least two geode pieces in the bonding material when the bonding material covers the joint formed in an exterior surface of the reassembled geode.

A system to break a geode is further disclosed comprising a geode divided into at least two geode pieces and a bonding material for reassembling the at least two geode pieces when the at least two geode pieces are associated together. The system further comprises a core of the geode wherein the core comprises crystals or concentric banding. The crystals or concentric banding are exposed when the reassembled geode is re-broken. The at least two geode pieces can comprise at least one of the following: hemispheres, uneven pieces, symmetrical pieces, asymmetrical pieces, jigsaw pieces, zig-zag pieces, wave pieces, and sections. The system can further comprise a joint formed between the at least geode pieces of the reassembled geode wherein the bonding material is applied to cover the joint, wherein the boding material comprises at least one of the following: plaster, cement, concrete, glue, epoxy, adhesive, resin, a polymer material, a breakable veneer, a crack-resistant coating, a colorant, and a pigment. The system can further comprise an exterior surface of the reassembled geode wherein the bonding material is applied to the exterior surface wherein the boding material comprises at least one of the following: plaster, cement, concrete, glue, epoxy, adhesive, resin, a polymer material, a breakable veneer, a crack-resistant coating, a colorant, and a pigment. The system further comprises a support layer applied on an exterior surface of the geode, wherein the bonding material engages and covers the support layer and wherein the support layer strengthens and supports a joint formed between the reassembled the at least two geode pieces wherein the support layer comprises at least one of the following: a mesh layer, a plastic mesh layer, a wire mesh layer, fabric pieces, fabric lattice, wire lattice, plastic lattice, wire, and wire bits. The system further comprises a location of a joint formed between said reassembled said at least two geode pieces denoted in said bonding material when said bonding material covers said joint formed in an exterior surface of said reassembled geode.

An apparatus to break a geode is also disclosed comprising a geode breaking tool for re-breaking a reassembled geode wherein the reassembled geode comprises at least two geode pieces fitted together and covered with a bonding material comprising at least one of the following: plaster, cement, concrete, glue, epoxy, adhesive, resin, a polymer material, a breakable veneer, a crack-resistant coating, a colorant, and a pigment. The geode breaking tool can comprise at least one of the following: a specialized geode breaking tool that aligns with a denoted joint mark in said bonding material, a hammer, and a weighted object.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

The embodiments now will be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context dearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
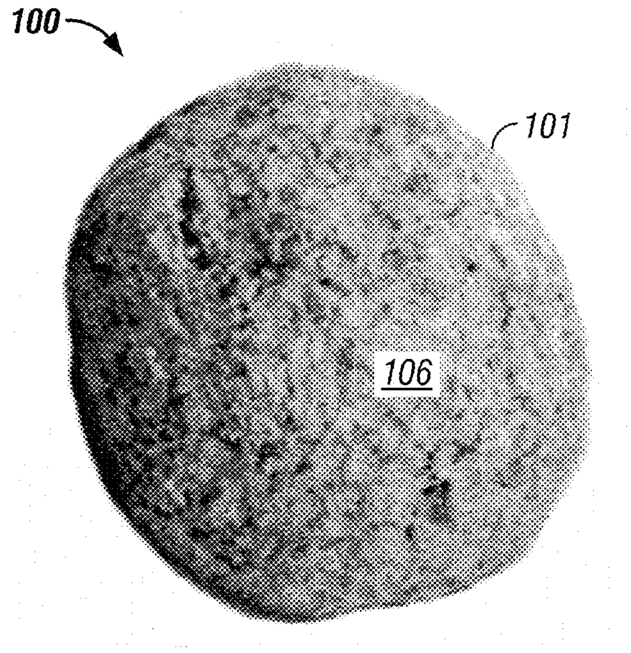
FIG. 1 illustrates a pictorial illustration of an unbroken geode, in accordance with the disclosed embodiments.

FIG. 1 illustrates a pictorial illustration 100 of a whole, unbroken geode 101, in accordance with the disclosed embodiments. A whole geode 101, or any other type of rock, stone, or geological formation, can be cut into two half-spheres, multiple slices or other shapes to reveal the crystals inside. A whole geode 101 can be cleaned using a brush, chisel, and/or chemical and water wash to remove lose debris from the exterior surface 106 of the geode 101. A whole geode 101 can be broken or cut into at least two viable pieces, or grooved with a circumferential groove. The geode pieces can be reassembled and connected to each other using a bonding material that supports the joint formed between the reassembled pieces. The bonding layer can denote a joint guideline to assist in aligning a geode breaking tool for re-breaking the whole geode 101. A support layer can be added for additional strength, support, and geode crumbling prevention. The reassembled whole geode 101 can be safely and easily re-broken without crumbling the exterior and interior surface of the whole geode 101. The geode's interior crystals or concentric lines can be safely appreciated within a piece or section of a reassembled and re-broken geode.

Figure 2:
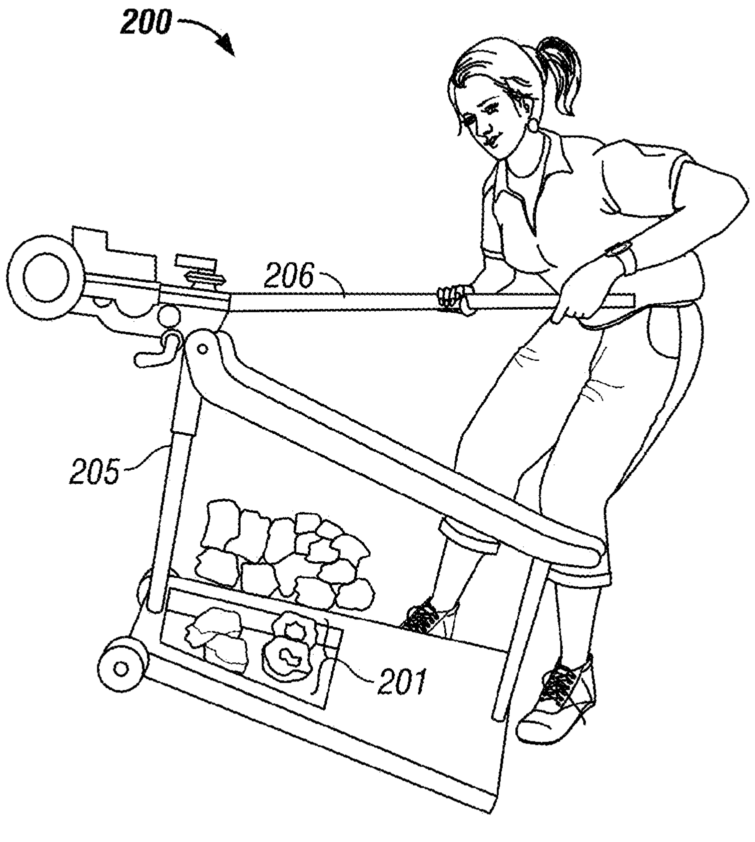
FIG. 2 illustrates a pictorial illustration of a geode cutting tool used for cutting a geode into two half-spheres, in accordance with the disclosed embodiments.

FIG. 2 illustrates a pictorial illustration 200 of a geode cutting tool used for cutting a geode 201 into two half-spheres, in accordance with the disclosed embodiments. For example, the geode 201 can be cut into pieces using an iron pipe cutter 205. The geode 201 breaks in half when pushing down on the handle 206 of the iron pipe cutter 205, as illustrated in FIG. 2. The best geode cuts can be selected when cutting the geodes with a pipe cutter 205. The geode 201 can be cut into any number of shapes, two hemispheres or half-spheres, or sliced sections using a variety of cutting tools and methods. For example, a superabrasive diamond cutting tool for cutting or drilling stone, bricks, concrete, or asphalt can be used to cut the geode 201. Typically, a diamond cutting tool, such as, for example, a wet lapidary saw, comprises segments having diamond particles dispersed thereon and a metal core having the segments fixed thereto (not illustrated). In the cutting segment of a diamond cutting tool, a number of diamond particles can be arranged in a plurality of plate-shaped layers stacked perpendicularly to a cutting direction. Generally diamond cutting saw blades are comprised of a circular plate or disk made of soft metal, such as bronze or steel, having abrasive materials mounted along the entire periphery of a cutting blade. The abrasive materials are usually mounted to the periphery of the metal disk by a mechanical press-mounting method, and they are typically composed of diamond particles, so as to form a continuous-rim diamond circular saw blade with an excellent cutting effect when the geode 201 is supported in a vise.

The geode 201 can be cut by other cutting methods and tools. A chisel hit can be used to notch the geode 201 at different locations along the equatorial section of the geode 201 to mark a circumference line. The chisel is then tapped with a hammer, such as, for example, a metal claw hammer, to punctuate the surface. A stone chisel can be utilized to lightly score the entire circumference of the geode 201. The geode 201 can then break into two rough sections using a hammer. A cutting tool can also be used to cut specific shapes in the geode 201, such as, for example, a wave-like cut around the circumference, a zig-zag-like cut around the circumference, or any combination of cuts to allows the two halves or section of the geode 201 to fit together much like a jigsaw puzzle. Instead of cutting a geode 201 through to the center, a groove can be cut around the circumference of the geode 201. The groove provides a guide line for breaking the geode 201 open into salvageable, viable pieces or sections. A groove cutting tool having a guide function for accurately cutting a groove at various depths can be used to cut a groove around the circumference of a geode 201.

Figure 3:
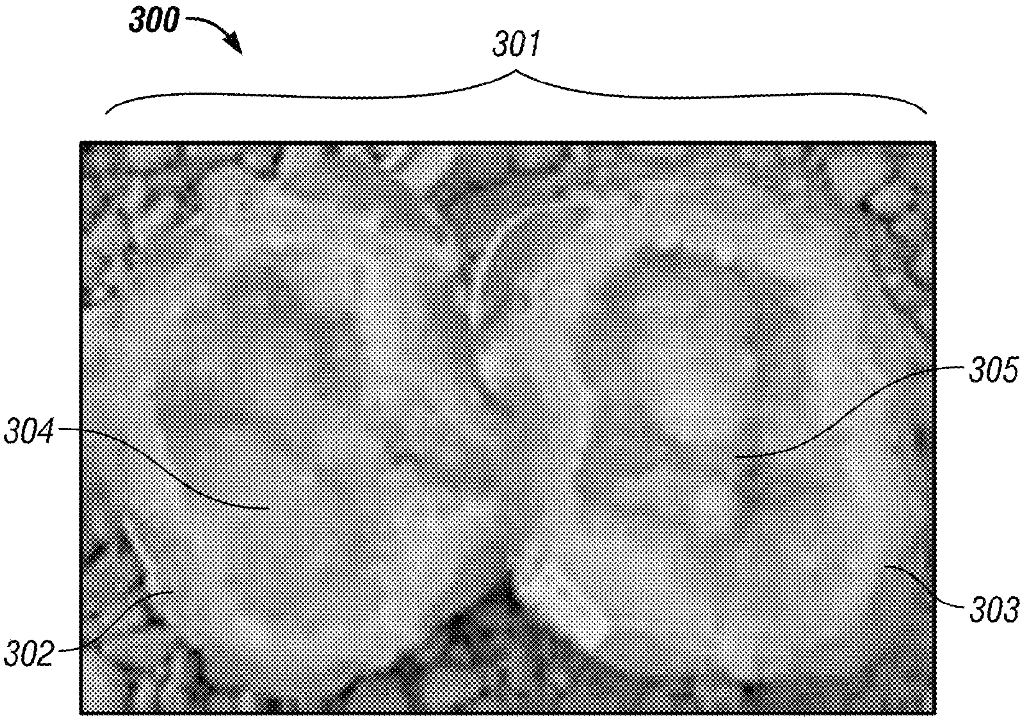
FIG. 3 illustrates a pictorial illustration of two-half spheres of a cut geode, in accordance with the disclosed embodiments.

FIG. 3 illustrates a pictorial illustration 300 of two-half spheres 302, 303 of a cut geode 301, in accordance with the disclosed embodiments. The two-half spheres 302, 303 of a cut geode 301 expose the crystal interior 304, 305. It is understood that the two-half spheres 302, 303 illustrated in FIG. 3 are exemplary illustrations of potential cuts of a cut geode 301 and are not intended to limited the embodiments solely to one cut resulting in two hemispheres. It is further understood that the cut geode 301 can be cut using the methods described herein in any number of pieces or sections.

Figure 4:
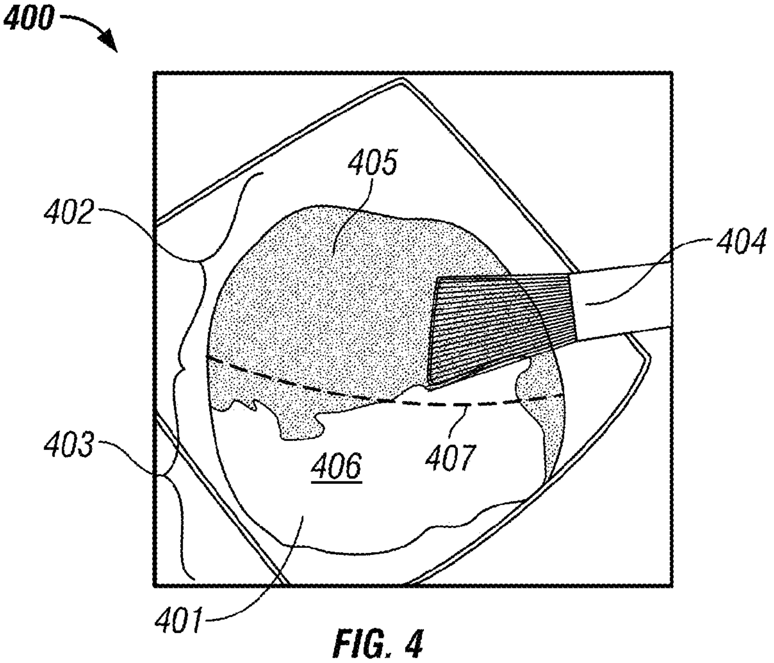
FIG. 4 illustrates a pictorial illustration of bonding the two half-spheres of a cut geode using a bonding material, in accordance with the disclosed embodiments.

FIG. 4 illustrates a pictorial illustration 400 of bonding the two half-spheres 402, 403 of a reassembled cut geode 401 using a bonding material 405, in accordance with the disclosed embodiments. The bonding material 405 is used to surround a reassembled cut geode 401. The bonding material 405 can surround the entire exterior surface 406 of the reassembled cut geode 401 or the joint 407 formed between the reassembled portions of the reassembled cut geode 401. The bonding material 405 may be dyed or colored to match the geode's surface or decorated using any color or design to appeal to many different users. It is understood that the term "bonding" is not intended to limit the disclosure. The term "bonding" as used herein is interchangeable with the terms "connecting", "adhering", "joining", "reconnecting", "reassembling", "attaching", "coating", etc.

The bonding material 405 can comprise a crack resistant coating, for example, applied to the exterior surface 406 of a reassembled cut geode 401, where the crack resistant coating increases resistance to high vertical and horizontal movements and high shear stresses on the exterior surface 406 of the reassembled cut geode 401. The crack resistant coating provides increased resistance to reflective cracking and improves durability during shipping, transporting, and handling of the reassembled cut geode 401. Bonding material 405 can be applied to the exterior surface 406 of the reassembled cut geode 401 by brushing 404, pouring, spray coating, adhering, layering, painting, and any other application means. The bonding material 405 can include, for example, plaster, cement, concrete, glue, epoxy, adhesive, resin, a polymer material, colorants, pigments, or a combination thereof. The bonding material 405 can be imprinted or impressed with shapes, decorative marks or features, or guidelines to assist in re-breaking the covered joint 407 in the reassembled cut geode 401. The bonding material 405 is allowed to dry and set. Finishing with an acid wash, stain, epoxy coating, or paint creates an aesthetically pleasing look of the exterior surface 406 of the reassembled cut geode 401. If one or more grooves are cut into the geode rather than cutting the geode in half or in sections, the groove can also be filled with the disclosed bonding material 405 to create an even exterior surface 406. A guideline or several marks can display the location of the groove in the surface of the reassembled cut geode 401 beneath the bonding material 405.

The bonding material 405 can also comprise a breakable veneer for simulating the appearance of stone, tile, concrete, etc. The veneer can be made by producing a mold of a desired texture, filling the mold with a mixture including Portland-type cement, resin, and colorant. The veneer may have a peel coat applied to the finished surface. When produced, the veneer is flexible, being able to conform to various surfaces of the geode and applied to various surfaces using any of various adhesives, and able to be transported as a finished form. The veneer may be scored and then broken or fractured along the scoring lines to create simulated broken stone, ceramic tiles, cut stone, etc. A support layer can be used in conjunction with a binding material comprising a breakable veneer. The veneer may be produced by first mixing epoxy components, resin, and water, followed by colorants, sand and cement to create the desired mixture for producing breakable cement veneer. In addition to the components described above, base may also include other additives in the mixture such as hardeners, UV resistant or reflective materials, low-heat materials, recycled materials such as ground concrete, plastic, glass, etc., or any other cement additive as desired by one of ordinary skill that provides a cement veneer as described. The reassembled cut geode 401 with the associated bonding material 405 and optional support layer can be packed individually or as a kit, along with a geode breaking tool.

Figure 5:
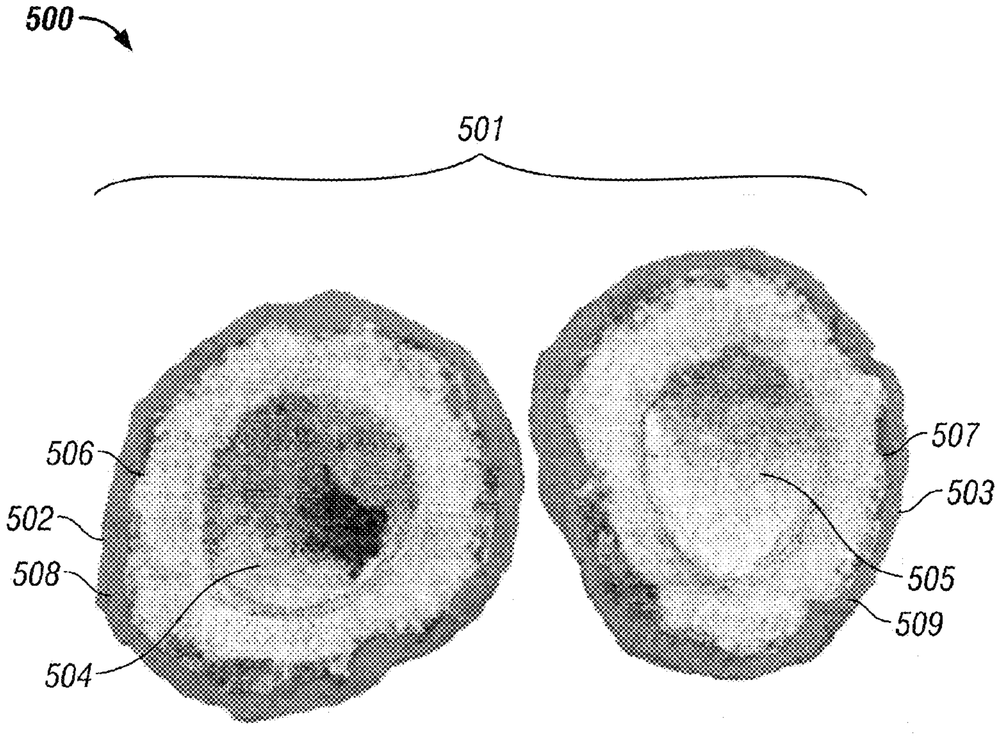
FIG. 5 illustrates a pictorial illustration of two half-spheres of a re-broken geode, in accordance with the disclosed embodiments.
Figure 6:
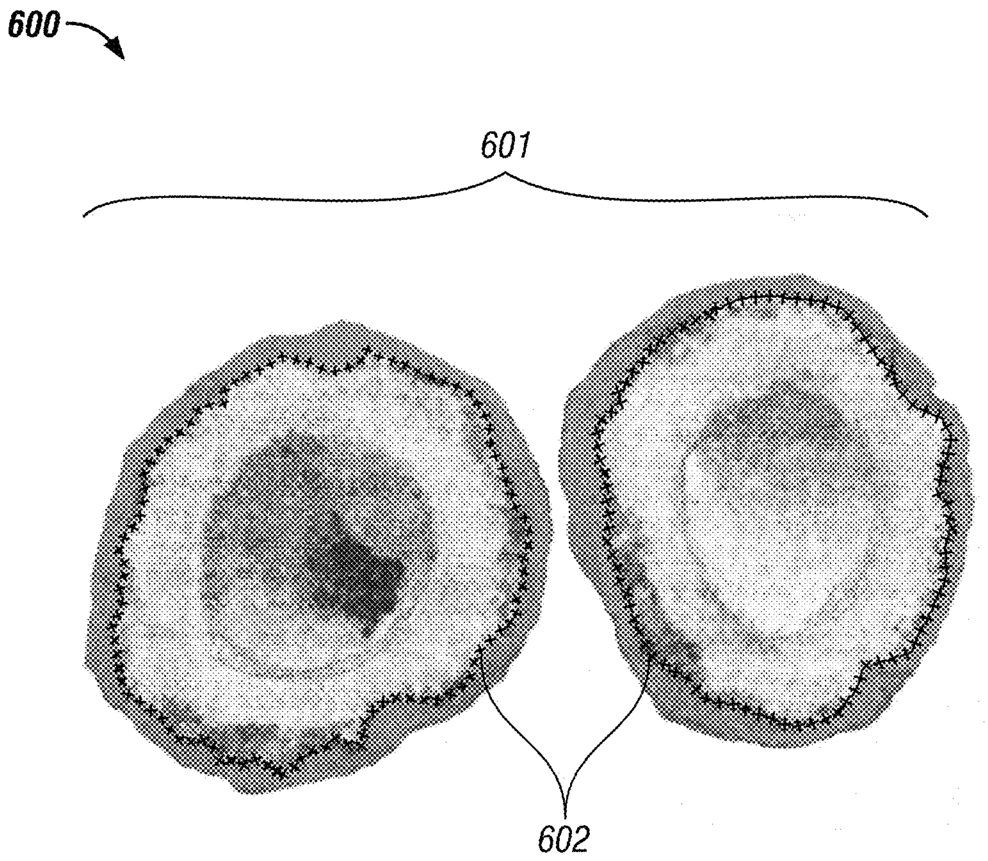
FIG. 6 illustrates a pictorial illustration of two half-spheres of a re-broken geode with an added support layer, in accordance with the disclosed embodiments.

FIG. 6 illustrates a pictorial illustration 600 of two half-spheres of a re-broken geode 601 with an added support layer 602, in accordance with the disclosed embodiments. To lend added support and strength, a support member, layer, or interlayer 602, as illustrated in FIG. 6 comprising a mesh layer, a plastic mesh layer, a wire mesh layer, fabric pieces, fabric lattice, wire lattice, plastic lattice, or wire bits, or any combination thereof, for example, can be included within or surrounding the bonding layer. The support member or layer 602 can surround the entire reassembled cut geode 401 or overlap only the cut portion, or joint 407, of the reassembled cut geode 401. The added support layer 602 strengthens the reassembled joint 407 of the reassembled cut geode 401 and supports the joint 407 during shipping, transporting, and handling of the reassembled cut geode 401. Support layer 602 strength and support to the reassembled cut geode 401 pieces and the surrounding bonding material 405. The support layer 602 can be added directly to the exterior surface 406 of the reassembled cut geode 401. In an alternate embodiment, the support layer 602 can be added directly to the bonding material 405 before applying to the reassembled cut geode 401. The support layer 602 holds the sections or pieces of the reassembled cut geode 401 in conjunction with the bonding material 405. The support layer 602 also prevents pieces of the reassembled cut geode 401 from fracturing, crumbling, exploding, or flying when re-broken, as described in FIG. 5.

FIG. 5 illustrates a pictorial illustration 500 the two half-spheres 502, 503 of a re-broken geode 501, in accordance with the disclosed embodiments. The re-broken geode 501 with the bonding material 508, 509 applied to the exterior 506, 507 and optional support layer 602 can be re-broken using gentle pressure or a tap along the joint 407 (as illustrated in FIG. 4) or groove of the reassembled geode 501. A user can re-break the reassembled cut geode 401, shown in FIG. 4, and pull apart the pieces of the support layer 602 between the two hemispheres 502, 503. The re-broken geode 501 can split apart at the joint 407 formed between the two hemispheres 502, 503. The bonding layer 405 splits at the joint 407 when the geode 501 is tapped or hit. It takes less force to break the reassembled cut geode 401 than with an unbroken whole geode 101, shown in FIG. 1, resulting in decreased risk of dangerous airborne pieces and a crumbled geode. Pieces of the re-broken geode 501 remain intact after re-breaking the geode 501, thus resulting in viable pieces to enjoy and study the interior core of crystals 504, 505 or concentric banding. A specialized geode breaking tool that aligns with denoted joint 407 marks in the bonding material, a hammer, a weighted object, etc. can be used to re-break the geode 501.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A system to break a geode, comprising:

a geode divided into at least two geode pieces;

a bonding material for reassembling said at least two geode pieces when said at least two geode pieces associate together; and an exterior surface of a reassembled said geode wherein said bonding material is applied to said exterior surface wherein said bonding material comprises at least one of the following: plaster, cement, concrete, glue, epoxy, adhesive, resin, a polymer material, a breakable veneer, a crack-resistant coating, a colorant, and a pigment.

2. The system of claim 1 further comprising:

a core of said geode wherein said core comprises crystals or concentric banding and said crystals or concentric banding are exposed when a reassembled said geode is re-broken.

3. The system of claim 1 wherein said at least two geode pieces comprise at least one of the following: hemispheres, uneven pieces, symmetrical pieces, asymmetrical pieces, jig-saw pieces, zig-zag pieces, wave pieces, and sections.

4. The system of claim 1 further comprising:

a joint formed between said at least two geode pieces of a reassembled said geode wherein said bonding material is applied to cover said joint, wherein said bonding material comprises at least one of the following: plaster, cement, concrete, glue, epoxy, adhesive, resin, a polymer material, a breakable veneer, a crack-resistant coating, a colorant, and a pigment.

5. The system of claim 1 further comprising:

a support layer applied surrounding said bonding material or within said bonding material applied on an exterior surface of said geode, wherein said bonding material engages and covers said support layer and wherein said support layer strengthens and supports a joint formed between said reassembled said at least two geode pieces wherein said support layer comprises at least one of the following: a mesh layer, a plastic mesh layer, a wire mesh layer, fabric pieces, fabric lattice, wire lattice, plastic lattice, wire, and wire bits.

6. The system of claim 1 further comprising:

a location of a joint formed between said reassembled said at least two geode pieces denoted in said bonding material when said bonding material covers said joint formed in an exterior surface of a reassembled said geode.

7. A system to break a geode, comprising:

a geode divided into at least two geode pieces;

a bonding material for reassembling said at least two geode pieces when said at least two geode pieces associate together; and a joint formed between said at least two geode pieces of a reassembled said geode wherein said bonding material is applied to cover said joint, wherein said bonding material comprises at least one of the following: plaster, cement, concrete, glue, epoxy, adhesive, resin, a polymer material, a breakable veneer, a crack-resistant coating, a colorant, and a pigment.

8. The system of claim 7 further comprising:

a core of said geode wherein said core comprises crystals or concentric banding and said crystals or concentric banding are exposed when a reassembled said geode is re-broken.

9. The system of claim 7 wherein said at least two geode pieces comprise at least one of the following: hemispheres, uneven pieces, symmetrical pieces, asymmetrical pieces, jig-saw pieces, zig-zag pieces, wave pieces, and sections.

10. The system of claim 7 further comprising:

an exterior surface of a reassembled said geode wherein said bonding material is applied to said exterior surface wherein said bonding material comprises at least one of the following: plaster, cement, concrete, glue, epoxy, adhesive, resin, a polymer material, a breakable veneer, a crack-resistant coating, a colorant, and a pigment.

11. The system of claim 7 further comprising:

a support layer applied surrounding said bonding material or within said bonding material applied on an exterior surface of said geode, wherein said bonding material engages and covers said support layer and wherein said support layer strengthens and supports a joint formed between said reassembled said at least two geode pieces wherein said support layer comprises at least one of the following: a mesh layer, a plastic mesh layer, a wire mesh layer, fabric pieces, fabric lattice, wire lattice, plastic lattice, wire, and wire bits.

12. The system of claim 7 further comprising:

a location of a joint formed between said reassembled said at least two geode pieces denoted in said bonding material when said bonding material covers said joint formed in an exterior surface of a reassembled said geode.

13. A system to break a geode, comprising:

a geode divided into at least two geode pieces;

a bonding material for reassembling said at least two geode pieces when said at least two geode pieces associate together; and a location of a joint formed between said reassembled said at least two geode pieces denoted in said bonding material when said bonding material covers said joint formed in an exterior surface of a reassembled said geode.

14. The system of claim 13 further comprising:

a core of said geode wherein said core comprises crystals or concentric banding and said crystals or concentric banding are exposed when a reassembled said geode is re-broken.

15. The system of claim 13 wherein said at least two geode pieces comprise at least one of the following: hemispheres, uneven pieces, symmetrical pieces, asymmetrical pieces, jigsaw pieces, zig-zag pieces, wave pieces, and sections.

16. The system of claim 13 further comprising:

a joint formed between said at least two geode pieces of a reassembled said geode wherein said bonding material is applied to cover said joint, wherein said bonding material comprises at least one of the following: plaster, cement, concrete, glue, epoxy, adhesive, resin, a polymer material, a breakable veneer, a crack-resistant coating, a colorant, and a pigment.

17. The system of claim 13 further comprising:

an exterior surface of a reassembled said geode wherein said bonding material is applied to said exterior surface wherein said bonding material comprises at least one of the following: plaster, cement, concrete, glue, epoxy, adhesive, resin, a polymer material, a breakable veneer, a crack-resistant coating, a colorant, and a pigment.

18. The system of claim 13 further comprising:

a support layer applied surrounding said bonding material or within said bonding material applied on an exterior surface of said geode, wherein said bonding material engages and covers said support layer and wherein said support layer strengthens and supports a joint formed between said reassembled said at least two geode pieces wherein said support layer comprises at least one of the following: a mesh layer, a plastic mesh layer, a wire mesh layer, fabric pieces, fabric lattice, wire lattice, plastic lattice, wire, and wire bits.

* * * * *